United States Patent
Ohishi et al.

(10) Patent No.: US 6,693,703 B2
(45) Date of Patent: Feb. 17, 2004

(54) DISTANCE MEASURING DEVICE AND METHOD FOR ADJUSTING PHOTODETECTION UNIT OF DISTANCE MEASURING DEVICE

(75) Inventors: Masahiro Ohishi, Tokyo-to (JP); Kaoru Kumagai, Tokyo-to (JP); Ken-ichiro Yoshino, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 09/726,143

(22) Filed: Nov. 29, 2000

(65) Prior Publication Data

US 2001/0002860 A1 Jun. 7, 2001

(51) Int. Cl.[7] .............................. G01C 3/08; H01J 40/14
(52) U.S. Cl. ................. 356/5.01; 356/5.1; 250/214 AG; 250/214 C
(58) Field of Search ................................ 356/3.01–5.15; 250/214 C, 214 AG

(56) References Cited

U.S. PATENT DOCUMENTS

| | | | | |
|---|---|---|---|---|
| 3,815,994 A | * | 6/1974 | Peckham | |
| 5,396,510 A | * | 3/1995 | Wilson | 356/5.01 |
| 5,694,204 A | * | 12/1997 | Nakase et al. | 356/5.15 |

* cited by examiner

Primary Examiner—Stephen C. Buczinski
(74) Attorney, Agent, or Firm—Nields & Lemack

(57) ABSTRACT

The present invention provides a distance measuring device for measuring a distance, comprising a light emitting unit for emitting a measuring light beam toward an object to be measured, and a photodetection unit for receiving a reflected measuring light beam reflected from the object to be measured, wherein said distance measuring device comprises a gain control unit for changing photodetection sensitivity of said photodetection unit by a bias voltage and a light amount switching unit for variably changing a light amount of the light emitting element which emits the light beam toward the photodetection unit.

7 Claims, 5 Drawing Sheets

# DISTANCE MEASURING DEVICE AND METHOD FOR ADJUSTING PHOTODETECTION UNIT OF DISTANCE MEASURING DEVICE

BACKGROUND OF THE INVENTION

The present invention relates to a distance measuring device, in which sensitivity of a photodetection unit of a distance measuring device is easily adjustable, and the invention also relates to a method for adjusting the photodetection unit of the distance measuring device.

In distance measurement based on a light wave, a modulated measuring light beam is used, and a distance is determined from a phase difference of the reflected light beam. FIG. 4 is a drawing to explain a basic type of a distance measuring unit 1 of a distance measuring device, and FIG. 5 is a block diagram to explain the control unit 13 of the distance measuring device.

When a distance measuring light beam 4 is emitted from a light emitting element 3 which is modulated and driven by an oscillator 2, the distance measuring light 4 is turned to a parallel beam by an objective lens 5 and this beam is projected to a reflection prism 6, which is an object to be measured. The distance measuring light 4 reflected by the reflection prism 6 enters the objective lens 5 again and is received by a photodetection element 7. A part of the distance measuring light beam emitted from the light emitting element 3 is reflected by a reflection mirror 9 and it is received by the photodetection element 7 as an internal reference light beam 12.

Based on photodetection signals of the received distance measuring light beam 4 and the received internal reference light beam 12, the distance is calculated from the phase difference by a distance measuring circuit 8.

The distance to the object to be measured (the reflection prism 6) as obtained by the distance measuring circuit 8 is displayed on a display unit 15 as a numerical value indicating the distance based on the control by a CPU 14. Distance measuring instruction, data, etc. are inputted from a keyboard unit 16.

FIG. 6 is a drawing to explain the distance measuring unit 1 more concretely.

On the side of the light emitting element 3, a chopper 17 is provided to cut off the distance measuring light beam 4 coming from the light emitting element 3 such as LED, LD, etc., and the chopper 17 is rotated by an optical path changing motor 18. On the side of the photodetection element 7, a density filter 20 is provided to filter a reflected distance measuring light 4', and the density filter 20 is rotated by a density adjusting motor 21. As the photodetection element 7, APD (avalanche photodiode) is used depending on the conditions such as photodetection sensitivity.

The chopper 17 is provided with such a pattern that the light beam on the inner side and the light beam on the outer side are alternately cut off. When the chopper 17 is rotated by the optical path changing motor 18, the optical path is changed alternately. The density filter 20 is provided with such a pattern that the density is gradually changed in rotating direction. When a rotating position of the density filter 20 is selected by the density adjusting motor 21, the received light amount of the photodetection element 7 can be adjusted. The light amount of the reflected distance measuring light beam 4' entering the photodetection element 7 is increased or decreased according to the distance between the reflection prism 6 and the distance measuring device. By properly selecting the position of the density filter 20, the received light amount of the photodetection element 7 can be maintained on a constant level.

Based on the photodetection light amount (i.e. the received light amount) of the photodetection element 7, the density adjusting motor 21 is rotated so that the light amount of the reflected distance measuring light beam 4' and the internal reference light beam 12 entering the photodetection element 7 is maintained at a constant level, and the position of the density filter 20 is controlled. In synchronization with a reference signal issued by the distance measuring circuit 8, the optical path changing motor 18 is rotated and controlled, and the reflected distance measuring light beam 4' and the internal reference light beam 12 entering the photodetection element 7 are switched over.

The avalanche photodiode (APD) as described above has highly accurate photodetection sensitivity and has a wide dynamic range, and it is used as a photodetection element. However, the characteristics of APD widely vary according to each individual element, and adjustment is necessary when it is incorporated in a distance measuring device. In particular, the adjustment is indispensable in case of a distance measuring device with high accuracy.

By changing a bias voltage, APD has an ability to adjust a gain multiplication of an electric current by receiving the light beam. The characteristics of the bias voltage and the output current of APD are shown in FIG. 7. As shown in FIG. 7, APD has a wide range of the gain multiplication, and it can be 150 times or more. When the bias voltage exceeds a certain level (Va), an avalanche phenomenon occurs. Therefore, in the adjustment of APD, the bias voltage is set to a value lower than the bias voltage to induce the avalanche while maintaining the needed gain multiplication.

Description will be given now on a conventional adjustment mode of APD.

In the past, a special-purpose adjustment tool has been required for the adjustment.

As shown in FIG. 8, a conventional type adjustment tool comprises a combination of an LED 22 for adjustment and a density filter 23.

First, a light beam is emitted from the LED 22, of which output light amount is determined at a constant level, and it is projected toward the photodetection element 7 at a predetermined position. The emitted light beam is modulated in the same manner as the actual distance measuring light beam 4.

APD directly receives the light beam from the LED 22, and the adjustment is made from a value obtained by photoelectric conversion. The gain multiplication in this case is assumed as 1×.

Next, a 1/150 density filter 23 is inserted between the photodetection element 7 and the LED 22. The photodetection light amount of the APD is turned to 1/150 of the initial value. When the photodetection light amount is decreased to 1/150, the bias voltage is increased in such manner that the output current from APD is equalized to the value when the density filter 23 is not used. By the equalized bias voltage, the gain multiplication of 150 times is obtained.

However, even with the photodetection element 7 thus adjusted, it sometimes happens that the accurate output current as set to 150 times may not be obtained depending on the frequency of the use of the distance measuring device, the course over time, etc. In such case, the product must be adjusted again. For this reason, in the past, the distance measuring device has been re-adjusted periodically or after the use of a predetermined period of time. As described above, a special-purpose adjustment tool and a measuring instrument are required for the adjustment, and the user of the distance measuring device cannot perform adjustment as desired, and the re-adjustment has been usually requested to the manufacturer. This means that complicated procedures are required each time the distance measuring device has to be sent back to the manufacturer for re-adjustment. Also, the distance measuring device cannot be used during the re-adjustment, and this causes much inconvenience to the user.

SUMMARY OF THE INVENTION

It is an object of the present invention to provide a distance measuring device and a method for adjustment, by which it is possible to adjust the photodetection element (APD) in an easy and convenient manner, to eliminate complicated procedures for the re-adjustment, and to exclude the limitation on the use of the distance measuring device due to the re-adjustment.

To attain the above object, the present invention provides a distance measuring device for measuring a distance, comprising a light emitting unit for emitting a measuring light beam toward an object to be measured, and a photodetection unit for receiving a reflected light beam reflected from the object to be measured, wherein the distance measuring device comprises a gain control unit for changing photodetection sensitivity of the photodetection unit by a bias voltage and a light amount switching unit for variably changing a light amount of the light emitting element which emits said light beam toward the photodetection unit. Further, the present invention provides a distance measuring device as described above, wherein the light emitting unit comprises a light source for emitting the measuring light beam and a light emitting element for adjustment for emitting a specifying light beam for adjustment, and the light amount switching unit can variably change a light amount of the light emitting element for adjustment. Also, the present invention provides a method for adjusting a photodetection unit of a distance measuring device which has a light emitting unit for projecting a measuring light beam toward an object to be measured, and a photodetection element for receiving a reflected measuring light beam reflected from the object to be measured, comprising the step of projecting a light beam from the light emitting element with a plurality of values of specifying light amount toward the photodetection element, and the step of determining a range of photodetection sensitivity of the photodetection element in response to a change of the light amount. Further, the present invention provides a method for adjusting a photodetection unit of a distance measuring device as described above, wherein the light emitting unit comprises a light source for emitting a measuring light beam and a light emitting element for adjustment for emitting a specifying light beam for adjustment, wherein a light amount of the light emitting element for adjustment can be variably changed. Also, the present invention provides a method for adjusting a photodetection unit of a distance measuring device as described above, wherein the light emitting unit attenuates light at a predetermined gain multiplication to a specifying light amount, and a bias voltage is determined in such manner that sensitivity of a predetermined gain multiplication of the photodetection element can be obtained according to a light attenuating condition. Further, the present invention provides a method for adjusting a photodetection unit of a distance measuring device as described above, wherein the light emitting unit sequentially emits the light beam of a specifying light amount in a plurality of stages, a bias voltage is sequentially changed in response to the light amount emitted by the light emitting unit, and the bias voltage of the photodetection element is determined when the light emitting unit finishes a light emission in a predetermined plurality of stages. light emitting unit finishes a light emission in a predetermined plurality of stages.

DETAILED DESCRIPTION OF THE PREFERRED EMBODIMENT

Figure 1:
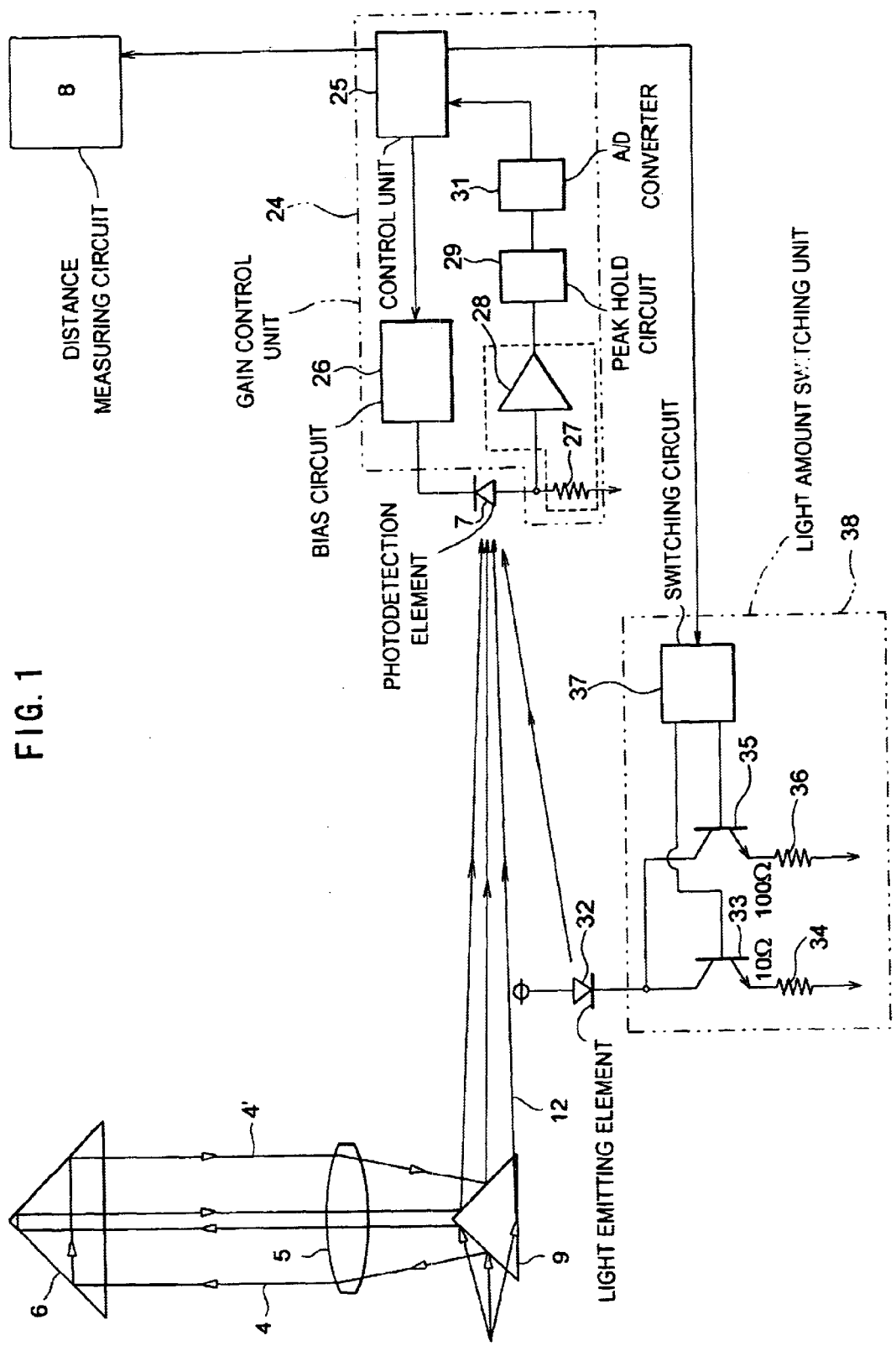
FIG. 1 is a circuit diagram showing an essential portion of an embodiment of the present invention.
Figure 6:
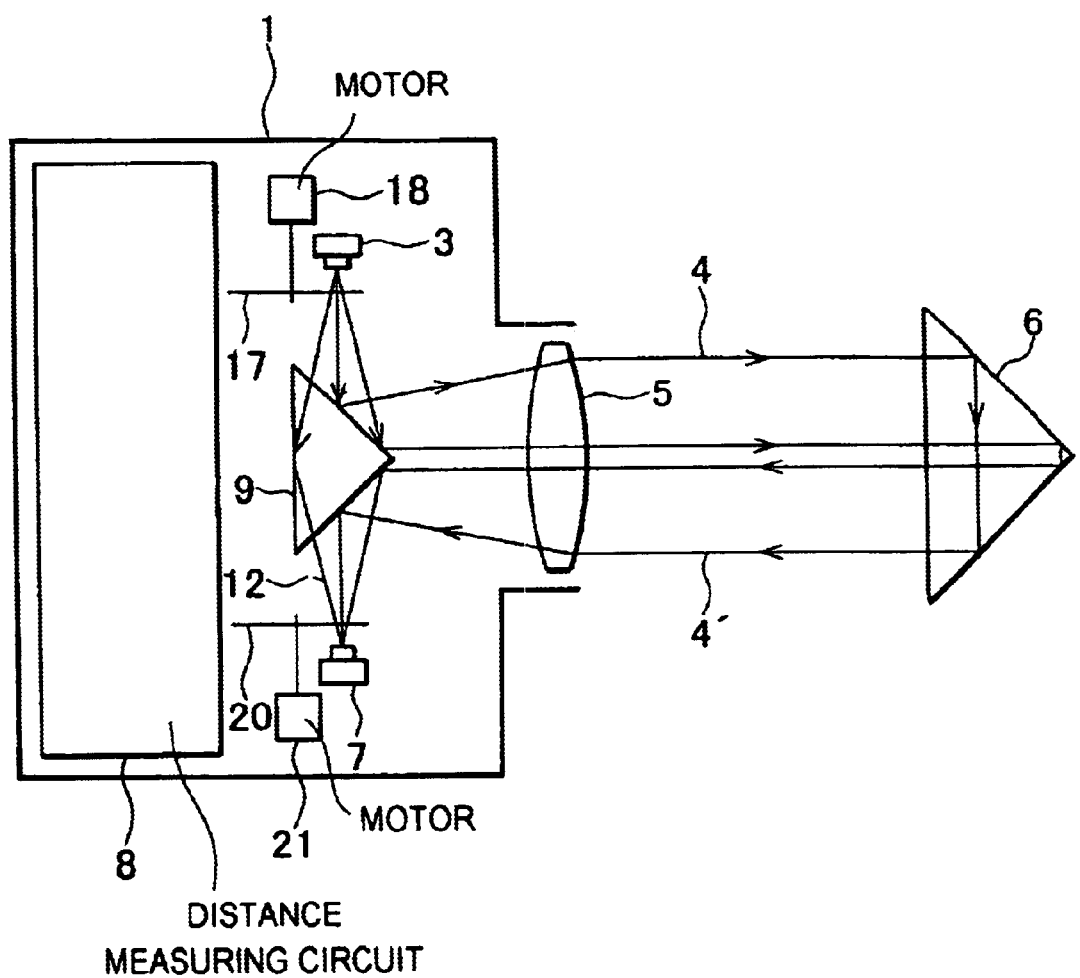
FIG. 6 is a drawing to explain the distance measuring unit of the distance measuring device.
Figure 7:
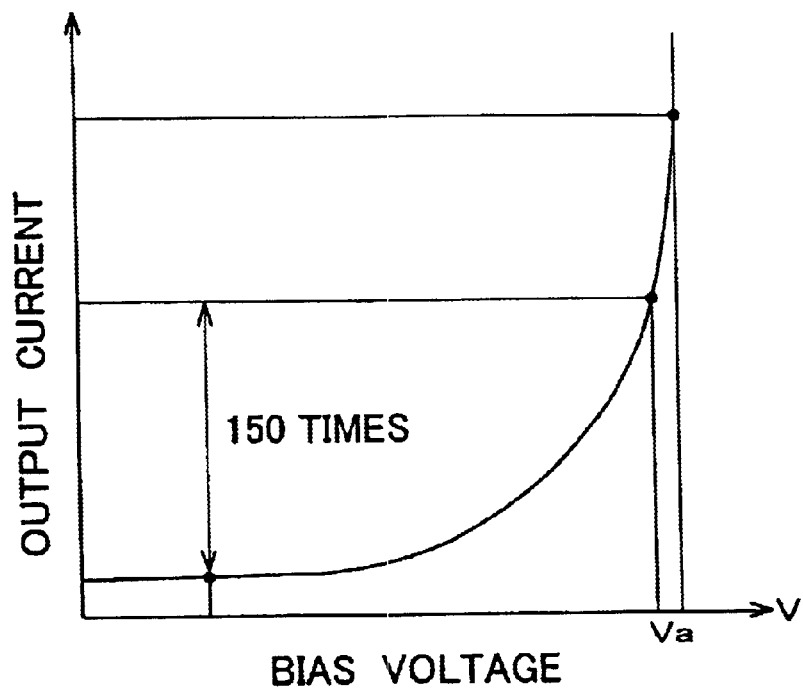
FIG. 7 is a diagram showing sensitivity characteristics of a photodetection element to be used in the distance measuring device.
Figure 8:
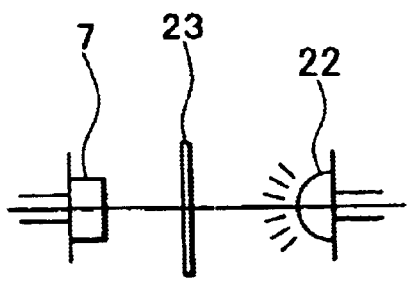
FIG. 8 is a drawing to explain general feature of an adjustment tool of a conventional type light emitting element for adjustment.

FIG. 1 is a block diagram showing a photodetection sensitivity adjusting unit of a distance measuring device. The distance measuring device in FIG. 6 is further provided with the photodetection sensitivity adjusting unit for adjusting the photodetection sensitivity of the photodetection element 7. The photodetection sensitivity adjusting unit comprises a gain control unit 24 and a light amount switching unit 38. The gain control unit 24 comprises a control unit 25, a bias circuit 26 where an output of a bias voltage is controlled by the control unit 25, a photodetection element 7 on which the bias voltage is applied by the bias circuit 26, a resistance 27 for adjusting a branched current value from the photodetection element 7, an amplifier 28 for amplifying the outputted branched current of the photodetection element 7, a peak-hold circuit 29 for holding a peak value of an output value from the amplifier 28 and an A/D converter 31 for converting the output value from the peak-hold circuit 209 to a digital signal.

The light amount switching unit 38 is connected to a light emitting element 32 for adjustment and the control unit 25. Explanation will be given on the light amount switching unit 38. A first switching transistor 33 and a first resistance 34 are connected to the light emitting element 32 for adjustment. Further, a second switching transistor 35 and a second resistance 36 are connected in parallel to the light emitting element 32 for adjustment. A resistance value (10 Ω in the figure) of the first resistance 34 is set to ¹⁄₁₀ of a resistance value (100 Ω in the figure) of the second resistance 36. A switching circuit 37 for applying an ON/OFF control voltage is connected to the first switching transistor 33 and the second switching transistor 35, and the switching circuit 37 is controlled by the control unit 25.

An adjustment specifying light beam to be emitted from the light emitting element 32 for adjustment is designed to enter the photodetection element 7, and it has an optical system for gain multiplication adjustment which is different from a distance measuring optical system shown in FIG. 6.

Figure 2:
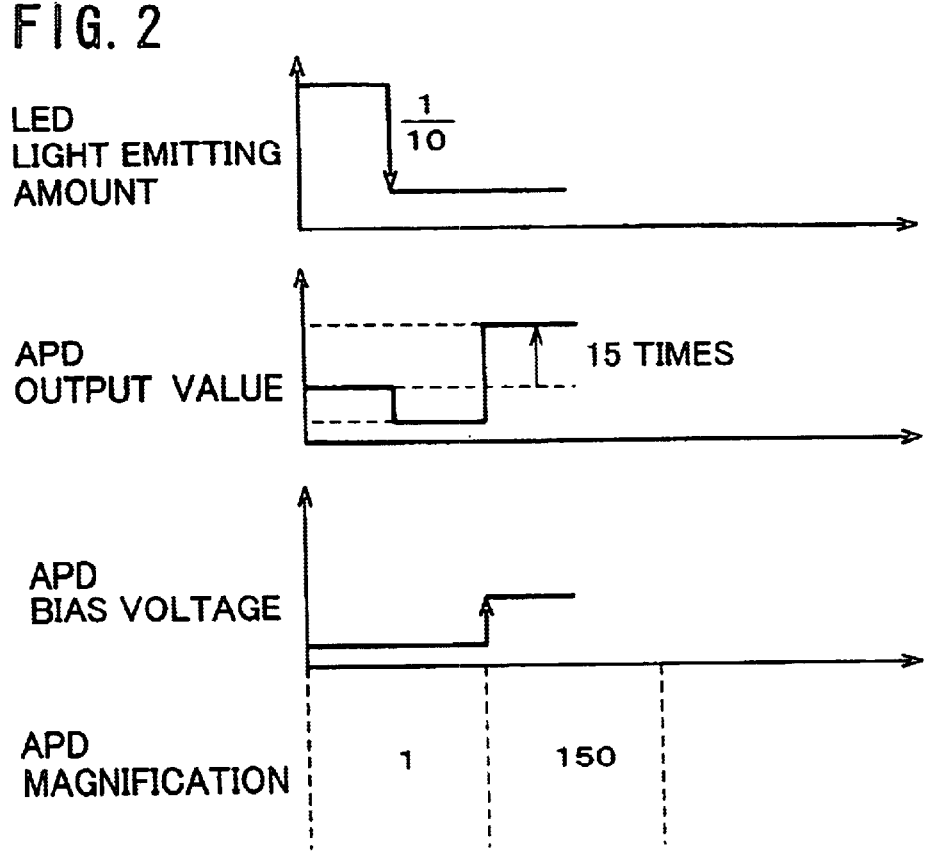
FIG. 2 shows drawings to explain operation of an embodiment of the present invention.

Description will be given below on the operation referring to FIG. 2.

A gain multiplication of the photodetection element 7 is adjusted after the distance measuring device has been used for a predetermined period of time or when a predetermined period of time has elapsed.

Light emission of the light emitting element 3 is stopped, and a light beam is emitted from the light emitting element 32 for adjustment.

First, the control voltage to the second switching transistor 35 is turned off, and the control voltage is applied on the first switching transistor 33. An initial driving current determined by the first resistance 34 flows to the adjustment light emitting element 32, and the adjustment light emitting element 32 emits the light beam. The reference bias voltage is applied on the photodetection element 7 by the bias circuit 26. The bias circuit 26 outputs an electric current which is determined by the reference bias voltage and by the light amount from the light emitting element 32 for adjustment. A reference peak value of the output current is detected by the peak-hold circuit 29 and the A/D converter 31, and this is inputted to the control unit 25. The control unit 25 stores this reference peak value in memory.

Next, a light amount switching command signal is issued from the control unit 25 to the switching circuit 37. The switching circuit 37 turns off the control voltage to the first switching transistor 33, and the control voltage is applied to the second switching transistor 35. A change driving current determined by the second resistance 36 flows to the adjustment light emitting element 32, and the light beam is emitted. The change driving current is 1/10 of the reference driving current, and the amount of the emitted light beam is attenuated to 1/10.

The output current value from the photodetection element 7 under light attenuation is detected by the peak-hold circuit 29 and the A/D converter 31, and this is stored by the control unit 25 as a smallest gain multiplication peak value.

The control unit 25 issues a bias voltage increase signal to the bias circuit 26, and the bias circuit 26 increases the bias voltage applied on the photodetection element 7. The current value outputted by the photodetection element 7 is feedbacked to the control unit 25 from the peak-hold circuit 29 and the A/D converter 31, and the bias circuit 26 is controlled until the feedbacked output current reaches a value which is 15 times as high as the reference peak value. The control unit 25 stores the peak value at the moment when the output current of the photodetection element 7 reaches a value 15 times as high as the reference peak value as the highest gain multiplication peak value, and the bias voltage at this moment is stored as the highest gain multiplication bias voltage.

Under light attenuation of the adjustment light emitting element 32, the ratio of the lowest gain multiplication peak value and the highest gain multiplication peak value of the photodetection element 7 is 150 times. By changing the bias voltage from the reference bias voltage to the highest magnification gain multiplication bias voltage, the photodetection sensitivity of the photodetection element 7 can be increased to 150 times.

The gain multiplication to be set is not limited to 150 times. If the peak value at the moment when the output current of the photodetection element 7 reaches a value 10 times as high as the reference peak value is stored as the highest gain multiplication peak value, and if the bias voltage at this moment is stored as the highest gain multiplication bias voltage, the photodetection sensitivity will be 100 times. In the above embodiment, the switching circuit 37 is separately provided, while it may be designed in such manner that, the amount of the emitted light beam from the light emitting element 3 may be changed by utilizing an internal reference light 12 and a reflected distance measuring light 4' which are emitted from the light emitting element 3.

Figure 3:
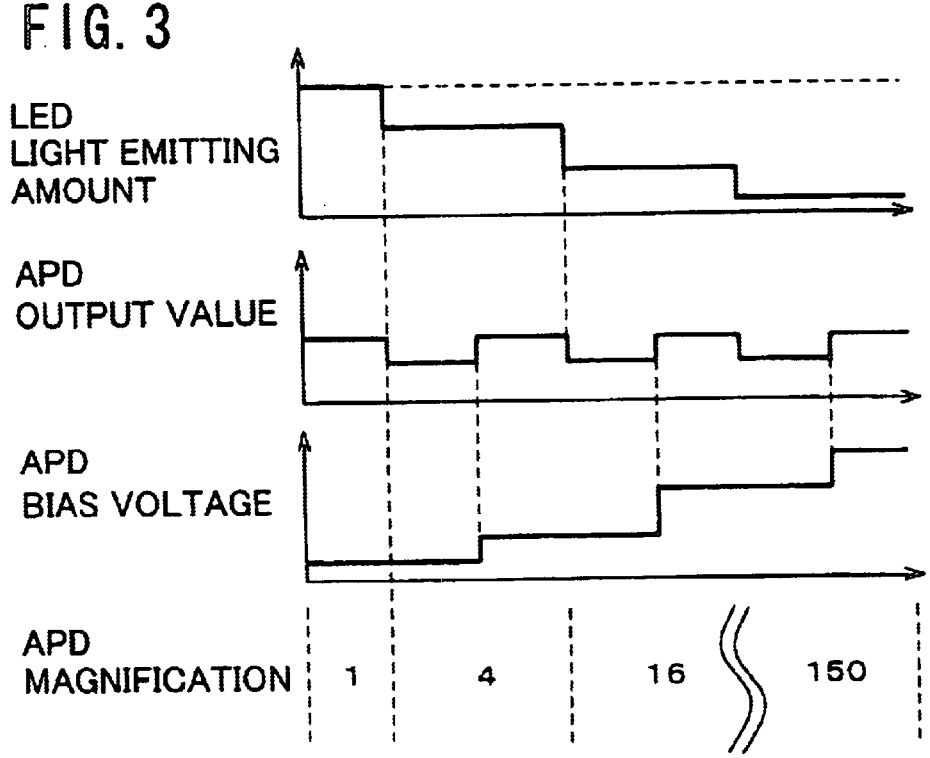
FIG. 3 shows drawings to explain operation of another embodiment of the present invention.
Figure 4:
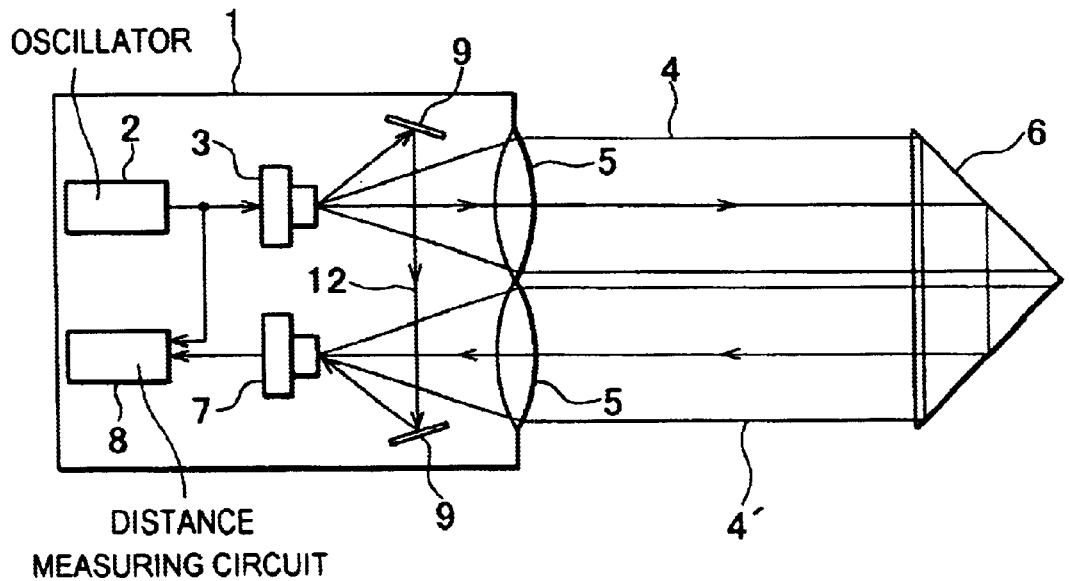
FIG. 4 is a drawing schematically showing a distance measuring unit of a distance measuring device.
Figure 5:
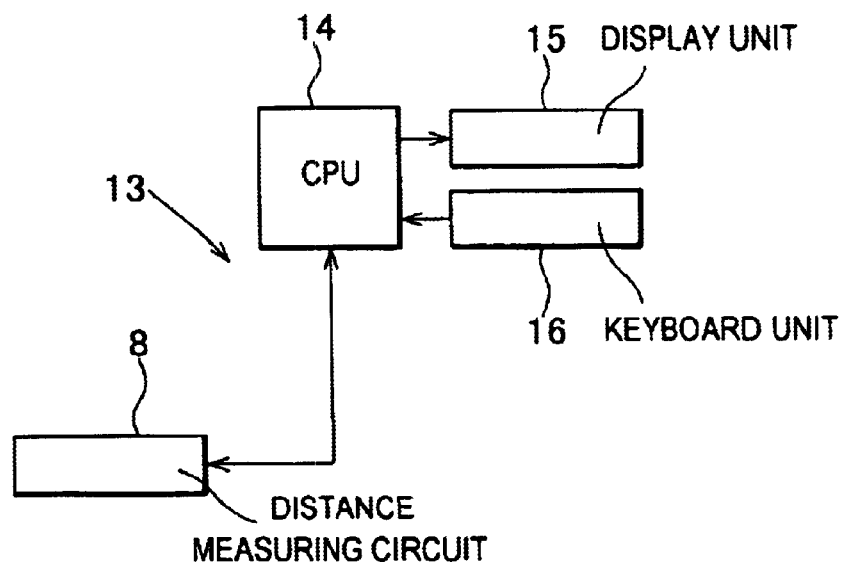
FIG. 5 is a block diagram of the distance measuring unit.

Description will be given now on another embodiment referring to FIG. 3.

For this embodiment, the details of a photodetection sensitivity adjusting unit are not specifically given here. The circuit configuration is similar to that of the above embodiment. Three or more switching elements are connected in parallel to the light emitting element 32 for adjustment, and the light amount is switched by three steps or more by the switching circuit 37. In the following, description will be given referring to FIG. 1.

The light amount of the adjustment light emitting element 32 is decreased stepwise by the light amount switching unit 38. The bias circuit 26 is controlled by the control unit 25 in such manner that the output current of the photodetection element 7 in each step serves as a reference value, and the bias voltage is increased stepwise. Finally, the gain multiplication of 150 times is obtained.

The light beam of a predetermined light amount is emitted from the adjustment light emitting element 32. The output of the photodetection element 7 of the bias voltage in this case is assumed as a gain of 1×. The light amount is determined in multiplication advance from the characteristics of the photodetection element 7 as specified by the manufacturer. The bias voltage at this moment is very low and it is nearly 0 V. The output current value of the photodetection element 7 at this moment is sampled, and it is converted by A/D conversion. Then, a reference peak value is detected and it is stored by the control unit 25.

Next, the light amount switching unit 38 is controlled by the control unit 25, and the light amount of the adjustment light emitting element 32 is decreased to the light amount of the next step. In this case, the peak value detected from the output current of the photodetection element 7 is decreased in association with the light amount. To compensate this decrease, the bias circuit 26 is controlled in such manner that the peak value will be equalized with the reference peak value, and the bias voltage is decreased.

The light amount of the adjustment light emitting element 32 is decreased and the bias voltage is increased so that the peak value is equalized with the reference peak value. This procedure is repeated, and the adjustment is completed when the gain multiplication ultimately reaches the predetermined gain multiplication value, i.e. 150 times.

In the above embodiment, the light amount is electrically switched, while the light amount may be optically switched using a density filter. It may be designed in such manner that a reflection prism 6 is placed at a predetermined position with respect to the distance measuring device, and the light amount received by the photodetection element 7 may be switched by utilizing the reflected distance measuring light 4' and the density filter 20.

The present invention provides a distance measuring device, which comprises a light emitting unit for emitting a distance measuring light beam to an object to be measured and a photodetection element for receiving a reflected measuring light beam reflected from the object to be measured. The light emitting unit can project the light beam of a plurality of values of specified light amount to the photodetection element, and a range of photodetection sensitivity of the photodetection element is determined in response to a change of the light amount. As a result, the sensitivity of the photodetection element (APD) can be adjusted without using a density filter. This makes it possible to design a system in a simple structure and to perform an adjustment in an easy manner. Also, it is possible to eliminate the complicated procedures for the readjustment and to exclude the limitation on the use of the distance measuring device for the purpose of the readjustment.

What is claimed is:

1. In a distance measuring device for measuring the distance between said device and an object, which device comprises a first light source adapted to direct a first light beam toward said object for reflection therefrom, a photodetection unit adapted to receive a portion of said first light beam which is reflected from said object, said photodetection unit having means for applying a bias voltage thereto which determines the photodetection sensitivity thereof, said photodetection unit having an output electronic current proportional to the amount of light incident thereon and said bias voltage, means for alternately directing said first light beam directly toward said photodetector unit, and means for measuring the phase difference between said reflected portion and said directly directed beam so as to indicate said distance, the improvement comprising a gain control unit adapted to change said bias voltage, a second light source adapted to direct a predetermined amount of light onto said photodetector unit, means for controlling said gain control unit in response to the amount of light reaching said photodetection unit from said second light source so as to set the bias voltage applied to said photodetection unit and thereby set said photodetection sensitivity so that said output electronic current reaches a reference value.

2. Apparatus in accordance with claim 1 including a light amount switching unit for variably changing said predetermined amount of light, whereby said reference value may be correspondingly varied.

3. A distance measuring device according to claim 2, wherein said light amount switching unit can variably change stepwise the light amount of said second light source.

4. A distance measuring device according to claim 1, wherein said gain control unit comprises a control unit for storing an electronic current value as a peak value, said electronic current value being determined by the light amount of said photodetection unit, said control unit switching the light amount of said second light source and/or storing a peak value when said gain control unit changes the bias voltage, and the photodetection sensitivity of said photodetection unit is set to a predetermined value.

5. A method for adjusting a photodetection unit of a distance measuring device for measuring the distance between said device and an object, which device comprises a first light source adapted to direct a first light beam toward said object for reflection therefrom, a photodetection unit adapted to receive a portion of said first light beam which is reflected from said object, said photodetection unit having means for applying a bias voltage thereto which determines the photodetection sensitivity thereof, said photodetection unit having an output electronic current proportional to the amount of light incident thereon and said bias voltage, means for alternately directing said first light beam directly toward said photodetector unit, and means for measuring the phase difference between said reflected portion and said directly directed beam so as to indicate said distance, said method comprising the step of directing a predetermined amount of light onto said photodetector unit, changing said predetermined amount of light, and changing said bias voltage in response to the change in said predetermined amount of light so as to set the bias voltage applied to said photodetection unit and thereby set said photodetection sensitivity to a predetermined value.

6. Method in accordance with claim 5, wherein said step of changing said predetermined amount of light includes reducing said predetermined amount of light, and wherein said step of changing said bias voltage includes increasing said bias voltage so as to overcompensate said reduction in the amount of light, so that said output electronic current is increased above that before said reduction of light, and the step of storing the respective amounts of the varied output electronic currents.

7. Method in accordance with claim 5, wherein said step of changing said predetermined amount of light includes sequentially emitting said light amount in a plurality of stages, and wherein said step of changing said bias voltage is sequentially changed in response to said light amount emitted by said second light source, and said bias voltage is determined when said second light source finishes a light emission in a predetermined plurality of stages.

* * * * *